United States Patent [19]
Fan

[11] Patent Number: 5,604,604
[45] Date of Patent: Feb. 18, 1997

[54] MULTIPLE HEAD SIGNAL DISTRIBUTION SYSTEM

[76] Inventor: George Fan, 32 Quidnic Rd., Newton, Mass. 02168

[21] Appl. No.: 383,950

[22] Filed: Feb. 6, 1995

[51] Int. Cl.[6] ..................................................... H04N 5/76
[52] U.S. Cl. ........................................................... 386/125
[58] Field of Search .................................. 358/342, 335; 348/7, 13; 361/627, 628, 622, 631, 632; 307/112, 139, 149

[56] References Cited

U.S. PATENT DOCUMENTS

| | | | |
|---|---|---|---|
| 4,388,655 | 6/1983 | Zenzefilis | 360/19.1 |
| 4,567,512 | 1/1986 | Abraham | 358/86 |
| 4,590,516 | 5/1986 | Abraham | 358/86 |
| 4,890,320 | 12/1989 | Monslow et al. | 380/10 |
| 4,949,187 | 8/1990 | Cohen | 358/335 |
| 5,018,021 | 5/1991 | Slater | 358/349 |
| 5,133,079 | 7/1992 | Ballantyne et al. | 455/4.1 |
| 5,134,499 | 7/1992 | Sata et al. | 358/342 |
| 5,140,437 | 8/1992 | Yonemitsu et al. | 358/342 |
| 5,168,353 | 12/1992 | Walker et al. | 358/86 |
| 5,172,413 | 12/1992 | Bradley et al. | 380/20 |
| 5,198,899 | 3/1993 | Cang | 358/86 |
| 5,206,722 | 4/1993 | Kwan | 358/86 |
| 5,414,455 | 5/1995 | Hooper et al. | 348/7 |
| 5,440,336 | 8/1995 | Buhro et al. | 348/13 |

OTHER PUBLICATIONS

W. D. Sincoskie, "System architecture for a large scale video on demand service", 1991.

Primary Examiner—Thai Q. Tran
Assistant Examiner—Y. Lee
Attorney, Agent, or Firm—Richard L. Miller, P.E.

[57] ABSTRACT

A multiple head signal distribution system, for reading data on a videodisc having a center, the data disposed on a continuous track on the disk and having a beginning wherein the disk is read with a plurality of heads, each head reading the same data at time delayed intervals.

8 Claims, 1 Drawing Sheet

MULTIPLE HEAD SIGNAL DISTRIBUTION SYSTEM

BACKGROUND OF THE INVENTION

The invention relates to a multiple head signal distribution system. More particularly, the invention relates to a system in which an information bearing disk is read with a plurality of staggered heads, for reading the same information at predetermined delayed intervals.

The demand for information services, especially movie and audio programs has increased dramatically. In the last few decades, the American public has outgrown the few viewing options offered by broadcast TV. They have demanded the ability to choose from a large variety of programming options.

Further, the viewing consumer wants to watch the program of their choice, and they want to watch it at a convenient time. Often, it is not possible to arrange one's life around the scheduled program start times. What is desired is the ability to watch the program at the desired start time.

The popularity of videocassette rentals has stemmed from the ability to choose from a large variety of movies, and then watch them when desired. However, renting videocassettes has its shortcomings. One must travel to the video store not only to select a program to watch, but also to return the videocassette the next day.

Pay-per-view programs have gained in popularity in part because of their convenience. However, they have three main shortcomings: selection, inconvenient start times, and inability to "stop" the program when the viewer is interrupted.

From the random accessibility of videocassettes, viewers have grown accustomed to watching a program when they wish, and to having the ability to pause or rewind the program when they are interrupted during its play. Pay-per-view programs do not give the viewers this convenience. One must begin watching the pay-per-view at the scheduled time, and must either stay glued to the television set, or risk missing a portion of the show.

Others have proposed systems for delivering video programs to a viewer.

U.S. Pat. Nos. 4,567,512 and 4,590,516 to Abraham both disclose a recorded program communication system.

U.S. Pat. No. 4,890,320 to Monslow et al discloses a television broadcast system for selective transmission of view-chosen programs at viewer-requested times. However, this system does not allow multiple viewers to view the same program with differing start times.

U.S. Pat. No. 5,133,079 to Ballantyne et al discloses a method and apparatus for distribution of movies in which the video signal is compressed for transmission to a subscriber.

U.S. Pat. No. 5,172,413 to Bradley et al discloses a video delivery system and method in which multiple versions of the same program are transmitted, each time delayed by five minutes. However, this system requires a separate video play unit and separate copy of the program for each time delayed version of the program transmitted to the subscribers.

While these units may be suitable for the particular purpose employed, or for general use, they would not be as suitable for the purposes of the present invention as disclosed hereafter.

SUMMARY OF THE INVENTION

It is an object of the invention to provide a videodisc based system which provides multiple time delayed signals to multiple viewers.

It is another object of the invention to provide a videodisc system that allows a viewer to select a convenient start time.

It is further object of the invention to provide a videodisc system that allows a second viewer to select a different start time from the first viewer and whereas video signals for the first viewer and second viewer originate from the same videodisc concurrently.

It is a still further object of the invention to produce a videodisc system in which the disk is read by a plurality of heads spaced at fixed angles, the relative radial position of the heads being continuously variable.

The invention is a multiple head signal distribution system, for reading data on a videodisc having a center, the data disposed on a continuous track on the disk and having a beginning. The disk is read with a plurality of heads, each head reading the same data at time delayed intervals.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
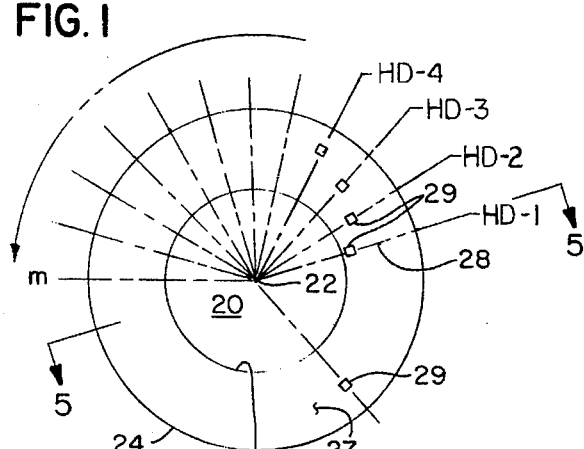
FIG. 1 is a diagrammatic plan view illustrating a general embodiment of the instant invention with n heads, each head angularly displaced from each other at n different angular coordinates with n corresponding respective radial coordinates (which correspond approximately to the length of repetitive play separation times between each head).

FIG. 1 illustrates a disk 20 having a center 22. The disk has an outer circumference 24 and an inner readable circumference 26. The disk has data in a readable region 27 which is defined as the area between the outer circumference 24 and the inner readable circumference 26. The data is contained within the readable region 27 on a continuous track which spirals between the outer circumference 24 and inner readable circumference 26. Ordinarily, the data is read by a head 29 which moves radially along the disk 20 at a speed which enables the head 29 to follow the radial movement of the continuous track as it spirals.

According to the present invention, a plurality of heads 29, numbered HD-1 through HD-n, are capable of reading the disk 20. The heads 29 are movable along radial paths 28 which extend from the center 22. Each head is disposed along its radial path 28 between the inner readable circumference 26 and the outer circumference 24.

Figure 4:
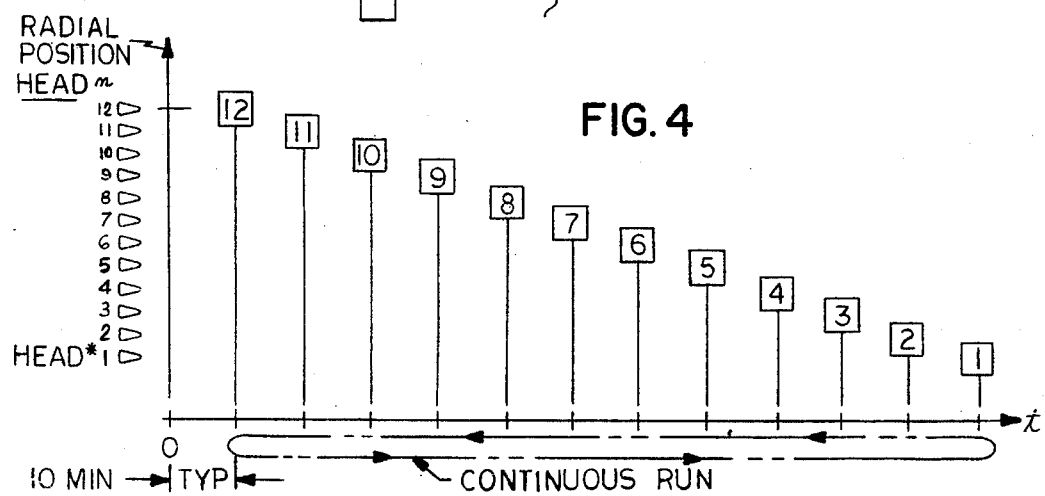
FIG. 4 is a timing diagram illustrating a specific example of a system having 12 heads with typically 10 minutes of repetitive play separation time between each head.

Advantageously, each head 29 is disposed along its radial path 28 at a different distance from the center 22 than the other heads. When at different distances from the center 22, each head will read a different portion of the continuous track at the same time. Thus, as illustrated in FIG. 4, each head will eventually read the same information from the disk 20, just at different time delayed intervals. Thus, as illustrated in FIG. 4, a first head HD-1 will read the data on the disk 20 approximately ten minutes before a second head HD-2.

An application of the present invention for providing movies will be briefly explored. A video disk bearing a movie can be played according to the present invention. The video disk has data representing a program on the continuous track, the data having a beginning. The first head HD-1 is positioned radially at the beginning of a program on the continuous track. The first head HD-1 will then move radially to follow the continuous track while reading the data contained therein. After a predetermined time interval, the second head HD-2 is positioned radially at the beginning of the program on the continuous track. The second head HD-2 will then move radially to follow the continuous track while reading the data contained therein. Thus, after the predetermined interval, both the first head HD-1 and the second head HD-2 read the videodisc, but the data read by the second head HD-2 will be a time delayed version of the data read by the first head HD-1. In fact, the time delay will equal the predetermined interval.

If a movie were being played by the present system, a first viewer might tune in and watch the signal generated by HD-1, while a second viewer might tune in after the predetermined interval and watch the signal generated by HD-2. Both the first viewer and the second viewer are able to watch the movie from its beginning.

A third head HD-3 can also be positioned on the disk 20 at the beginning of the program on the continuous track at a predetermined interval after the second head HD-2 is positioned. The third head HD-3 then reads the same data that the second head HD-2 had read before the predetermined interval, and that the first head HD-1 had read before two times the predetermined interval.

A fourth head HD-4 and further additional heads may be employed to provide multiple time delayed versions of the same program. Each time delayed version is separated by the predetermined interval. The predetermined interval (PDI) may be set according to how many heads (H) are employed in the system, and the length of the program (L). For example, the predetermined interval PDI can equal L divided by H.

In a system(used to play a typikal 120 minute movie, twelve heads may be employed. Therefore, the optimal predetermined interval would be ten minutes. Depending on the length of the program, and the number of heads employed, the predetermined interval would generally fall within the range of 1 to 30 minutes. However, the optimal range, for the convenience of the viewer, is 5 to 10 minutes.

It should also be noted that if a viewer has the capability to access to all n heads that the present invention provides a system which permits a viewer to fast forward of fast reverse to information at n locations at n intervals on the disk. This is a feature which could be extremely useful if the viewer must interrupt his viewing session and wishes to continue where he/she left off, or if the user wants to jump forward or backwards to respectively preview or review some information on the disk.

Figure 3:
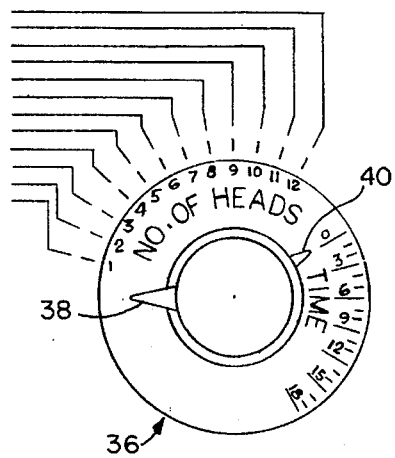
FIG. 3 is a diagrammatic elevational view of a typical concentric control dial which permits the user to select the number of heads in use and the length of repetitive play separation time between each head.
Figure 2:
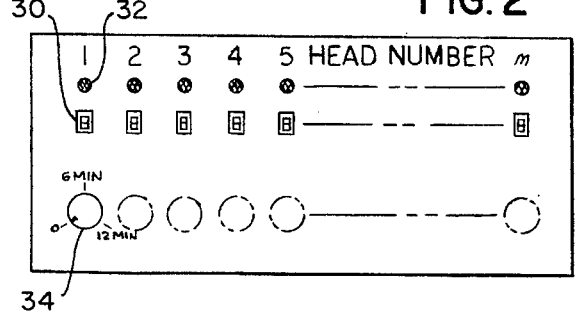
FIG. 2 is a diagrammatic elevational view of a typical control panel which permits the user to select the number of heads in use and the magnitude of repetitive play separation time between each head.

FIG. 2 and FIG. 3 illustrate typical control systems that may be used to select the number of heads in use, and the length of the predetermined interval.

As illustrated in FIG. 2, a head switch 30 may be employed to switch each head 29 on or off. A corresponding head indicator light 32 illuminates to indicate that the corresponding head 29 is in use. A corresponding interval control knob 34 can comprise a potentiometer to vary the length of the predetermined interval between the heads and an adjacent head. The head switch 30, the head indicator light 32 and the interval control knob 34 is repeated for each head in the system.

As illustrated in FIG. 3, a dual concentric selector 36 may be used to determine the number of heads in use, and the predetermined interval. The dual concentric selector 36 comprises a head selector 38 and an interval selector 40. The head selector 38 allows a user to select the number of heads in use, and the interval selector 40 allows the user to vary the predetermined interval.

Figure 5:
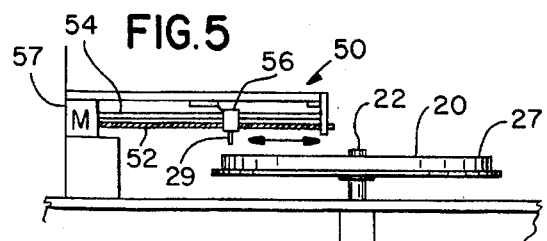
FIG. 5 is a diagrammatic side elevational view of a typical single head taken on line 5—5 in FIG. 1.

FIG. 5 illustrates a head assembly 50. The head assembly 50 extends radially from the center 22 of the disk 20. The head assembly 50 has a threaded drive rod 52 and a guide rod 54, which both extend radially from the center 22 and are substantially parallel to one another. A head block 56 is mounted for movement along the guide rod 54 under the control of the threaded drive rod 52. The threaded drive rod 52 is driven by a motor 57.

Figure 6:
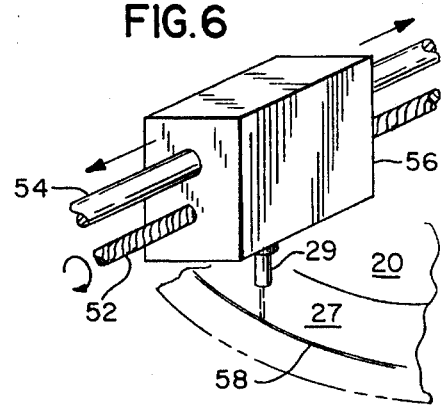
FIG. 6 is a diagrammatic perspective view of a typical head.

FIG. 6 details the head assembly 50. The head 29 is mounted to the head block 56. The head reads the disk 20, reading the data along the continuous track 58. The head 29 follows the continuous track 58 by moving along the guide rod 54. As illustrated, the threaded drive rod 52 rotates to move the head block 56 radially along the disk 20 to follow the continuous track 58.

The above referenced diagrams FIG. 1 to FIG. 6 illustrate typical mechanisms for of controlling and tracking for this Multihead Signal Distribution system, but are not to be considered limited thereto. Other present and future means of control and tracking methods and techniques may be applied to achieve the basis purposes of this invention generating multiple signals from a single video disk.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A method of allowing multiple viewers to simultaneously view different selected portions of a same video program that has a length and is constituted by video data contained in a continuous spiral track in a video disk with a center wherein the continuous spiral track in the video disk has a beginning, comprising the steps of:

a) rotating the video disk;

b) positioning a first head in the beginning of the continuous spiral track in the rotating video disk;

c) moving said first head radially inwardly towards the center of the rotating video disk and in the continuous spiral track in the rotating video disk;

d) threading said first head automatically radially inwardly towards the center of the rotating video disk on a first motor-operated, rotating, radially-disposed and threaded drive rod and being guided therealong by a first radially-disposed and smooth guide rod, so that first head moves automatically radially inwardly on the rotating video disk;

e) reading the video data contained in the continuous spiral track in the rotating video disk by said first head while the rotating video disk continues to rotate and said first head moves in the continuous spiral track in the rotating video disk;

f) causing the video data contained in the continuous spiral track in the rotating video disk that is being read by said first head to be simultaneously sent directly, without being stored and thereby in real time, to a viewing device by one of activating a first head switch disposed on a control panel and thereby illuminating a corresponding first head indicator light disposed in proximity to said first head switch, and rotating a head selector dial disposed on said control panel, so that a user can determine if the video data contained in the continuous spiral track in the rotating video disk that is being read by said first head is to be simultaneously sent directly to the viewing device and thereby allow the multiple viewers to view the selected portion of the same video program constituted by the video data contained in the continuous spiral track in the rotating video disk that is being simultaneously read by said first head without delay or possible lost or garbled information inherent to storage devices;

g) waiting a predetermined variable interval of time while said first head continuously reads the video data contained in the continuous spiral track in the rotating video disk before a second head is positioned, by at least one of rotating a first head interval dial disposed in proximity to said first head switch, and rotating a head interval dial disposed concentrically with said head selector dial, so that the amount of the video data contained in the continuous spiral track in the rotating video disk being read by the first head can be varied before said second head is positioned;

h) positioning said second head in the beginning of the continuous spiral track in the rotating video disk;

i) moving said second head radially inwardly towards the center of the rotating video disk and in the continuous spiral track in the rotating video disk, while said first head simultaneously moves radially inwardly towards the center of the rotating video disk and in the continuous spiral track in the rotating video disk and continues reading the video data contained in the continuous spiral track in the rotating video disk;

j) threading said second head automatically radially inwardly towards the center of the rotating video disk on a second motor-operated, rotating, radially-disposed, and threaded drive rod at a different radial distance from the center of the rotating video disk than said first head and being guided therealong by a second radially-disposed and smooth guide rod, so that said second head moves automatically radially inwardly on the rotating video disk at a different radial distance from the center of the rotating video disk than said first head so as not to interfere therewith;

k) reading the video data contained in the continuous spiral track in the rotating video disk that was previously read by said first head, by said second head after said predetermined interval of time of step g) has elapsed, so that the same video data contained in the continuous spiral track in the rotating video disk can be read at different times by said first head and said second head;

l) causing the video data contained in the continuous spiral track in the rotating video disk that is being read by said second head to be simultaneously sent directly, without being stored and thereby in real time, to the viewing device, by one of activating a second head switch disposed on said control panel and thereby illuminating a corresponding second head indicator light disposed in proximity to said second head switch, and rotating said head selector dial disposed on said control panel, so that the user can determine if the video data contained in the continuous spiral track in the rotating video disk that is being read by said second head is to be simultaneously sent directly to the viewing device and thereby allow the multiple viewers to view the selected portion of the same video program constituted by the video data contained in the continuous spiral track in the rotating video disk that is being simultaneously read by said second head without delay or possible lost or garbled information inherent to storage devices;

m) waiting a predetermined interval of time while said second head continues reading the video data contained in the continuous spiral track in the rotating video disk before a nth head is positioned, by at least one of rotating a second head interval dial disposed in proximity to said second head switch, and rotating said head interval dial disposed concentrically with said head selector dial, so that the amount of the video data contained in the continuous spiral track in the rotating video disk being read by the second head can be varied before said nth head is positioned;

n) positioning said nth head in the beginning of the continuous spiral track in the rotating video disk, wherein n>2;

o) moving said nth head radially inwardly towards the center of the rotating video disk and in the continuous spiral track in the rotating video disk, while said first head, said second head, and a n-1 head simultaneously move radially inwardly towards the center of the rotating video disk and in the continuous spiral track in the rotating video disk and continue reading the video data contained in the continuous spiral track in the rotating video disk;

p) threading said nth head automatically radially inwardly towards the center of the rotating video disk on a nth motor-operated, rotating, radially-disposed, and threaded drive rod at a different radial distance from the center of the rotating video disk than said first head, said second head, and said n-1 head and being guided therealong by a nth radially-disposed and smooth guide rod, so that said nth head moves automatically radially inwardly on the rotating video disk at a different radial distance from the center of the rotating video disk than said first head, said second head, and said n-1 head so as not to interfere therewith;

q) reading the video data contained in the continuous spiral track in the rotating video disk that was previously read by said first head, said second head, and said n-1 head, by said nth head after said predetermined interval of time of step m) has elapsed, so that the same video data contained in the continuous spiral track in the rotating video disk can be read at different times by said first head, said second head, said n-1 head, and said nth head; and r) causing the video data contained in the continuous spiral track in the rotating video disk that is being read by the nth head to be simultaneously sent directly, without being stored and thereby in real time, to the viewing device, by one of activating a nth head switch that is disposed on said control panel and thereby illuminating a corresponding nth head indicator light disposed in proximity to said nth head switch, and rotating said head selector dial disposed on said control panel, so that the user can determine if the video data contained in the continuous spiral track in the rotating video disk that is being read by the nth head is to be simultaneously sent directly to the viewing device and thereby allow the multiple viewers to view the selected portion of the same video program constituted by the video data contained in the continuous spiral track in the rotating video disk that is being simultaneously read by said nth head without delay or possible lost or garbled information inherent to storage devices.

2. The method as defined in claim 1, wherein each said predetermined interval of time in steps g) and m) is from 1 to 60 minutes.

3. The method as defined in claim 1, wherein each said predetermined interval of time in steps g) and m) is from 5 to 10 minutes.

4. The method as defined in claim 1, wherein each said predetermined interval of time in steps g) and m) is the length of the video program constituted by the video data contained in the continuous spiral track in the rotating video disk divided by the number of heads utilized in said method.

5. A multi-viewing video program viewing controller that allows multiple viewers to simultaneously view different selected portions of a video program which is constituted by video data, comprising:

a) a control panel;

b) a plurality of head control switches disposed on said control panel; each switch of said plurality of head control switches controlling a respective head of a plurality of heads; each head of said plurality of heads simultaneously reading the same video data constituting the video program at different intervals of time from each other and sending the video data constituting the video program being read by said respective head of said plurality of heads directly, without being stored and thereby in real time, to a viewing device, so that multiple viewers can simultaneously view the different selected portions of the video program at different times and without delay or possible lost or garbled information inherent to storage devices;

c) a plurality of head control switch indicator lights disposed on said control panel; each indicator light of said plurality of head control switch indicator lights disposed in proximity to a respective switch of said plurality of head control switches and indicating activation of said respective switch of said plurality of head control switches; and d) a plurality of time interval dials disposed on said control panel; each dial of said plurality of time interval dials disposed in proximity to a respective switch of said plurality of head control switches and varying the different intervals of time that each head of said plurality heads reads the same video data constituting the video program.

6. A multi-viewing video program viewing controller that allows multiple viewers to simultaneously view different selected portions of a video program which is constituted by video data, comprising:

a) a control panel;

b) a head control dial rotatively mounted on said control panel for controlling a plurality of heads; each head of said plurality of heads reading the same video data constituting the video program at different intervals of time from each other and sending the video data constituting the video program being read by a respective head of said plurality of heads, directly without being stored and thereby in real time, to a viewing device, so that multiple viewers can simultaneously view the different selected portions of the video program at different times and without delay or possible lost or garbled information inherent to storage devices; and c) a time interval dial disposed concentrically with said head control dial and varying the different intervals of time that each head of said plurality of heads reads the same video data constituting the video program.

7. A method of allowing multiple viewers to simultaneously view different selected portions of a video program which is constituted by video data in real time, comprising the step of interfacing with the video program a multi-viewing video program viewing controller which comprises:

a) a control panel;

b) a plurality of head control switches disposed on said control panel; each switch of said plurality of head control switches controlling a respective head of a plurality of heads; each head of said plurality of heads simultaneously reading the same video data constituting the video program at different intervals of time from each other and sending the video data constituting the video program being read by said respective head of said plurality of heads directly, without being stored and thereby in real time, to a viewing device, so that multiple viewers can simultaneously view the different selected portions of the video program at different times and without delay or possible lost or garbled information inherent to storage devices;

c) a plurality of head control switch indicator light's disposed on said control panel; each indicator light of said plurality of head control switch indicator lights disposed in proximity to a respective switch of said plurality of head control switches and indicating activation of said respective switch of said plurality of head control switches; and d) a plurality of time interval dials disposed on said control panel; each dial of said plurality of time interval dials disposed in proximity to a respective switch of said plurality of head control switches and varying the different intervals of time that each head of said plurality heads reads the same video data constituting the video program.

8. A method of allowing multiple viewers to simultaneously view different selected portions of a video program which is constituted by video data in real time, comprising the step of interfacing with the video program a multi-viewing video program viewing controller which comprises:

a) a control panel;

b) a head control dial rotatively mounted on said control panel for controlling a plurality of heads; each head of said plurality of heads reading the same video data constituting the video program at different intervals of time from each other and sending the video data constituting the video program being read by a respective head of said plurality of heads, directly without being stored and thereby in real time, to a viewing device, so that multiple viewers can simultaneously view the different selected portions of the video program at different times and without delay or possible lost or garbled information inherent to storage devices; and c) a time interval dial disposed concentrically with said head control dial for varying the different intervals of time that each head of said plurality of heads reads the same video data constituting the video program.

* * * * *